(12) United States Patent
Oakey et al.

(10) Patent No.: US 8,894,912 B2
(45) Date of Patent: Nov. 25, 2014

(54) APPARATUS FOR A MOLD VACUUM SYSTEM AND METHOD OF FORMING A POLYMERIC SHEET UTILIZING THE SYSTEM

(76) Inventors: Edwin J. Oakey, Clinton Township, MI (US); Rodney M. Tinney, Burleson, TX (US)

( * ) Notice: Subject to any disclaimer, the term of this patent is extended or adjusted under 35 U.S.C. 154(b) by 0 days.

(21) Appl. No.: 13/526,850

(22) Filed: Jun. 19, 2012

(65) Prior Publication Data

US 2012/0286458 A1  Nov. 15, 2012

Related U.S. Application Data

(62) Division of application No. 11/433,895, filed on May 12, 2006.

(51) Int. Cl.
| | |
|---|---|
| B29C 51/10 | (2006.01) |
| B29C 51/38 | (2006.01) |
| B29C 51/46 | (2006.01) |
| B29C 51/00 | (2006.01) |
| B29L 31/00 | (2006.01) |
| B29K 69/00 | (2006.01) |
| B29C 51/26 | (2006.01) |
| B29L 31/30 | (2006.01) |

(52) U.S. Cl.
CPC ............... B29C 51/10 (2013.01); B29C 51/46 (2013.01); B29C 2791/006 (2013.01); B29L 2031/778 (2013.01); B29K 2069/00 (2013.01); B29C 51/262 (2013.01); B29L 2031/3076 (2013.01); B29C 51/008 (2013.01)
USPC ........................................................ 264/533

(58) Field of Classification Search
USPC ...................... 264/553, 571; 269/21; 425/388
See application file for complete search history.

(56) References Cited

U.S. PATENT DOCUMENTS

| | | | |
|---|---|---|---|
| 2,367,642 A * | 1/1945 | Helwig | 264/553 |
| 3,001,901 A | 9/1961 | Barkley | |
| 3,069,287 A | 12/1962 | Hudson | |
| 3,140,325 A * | 7/1964 | Graff | 264/510 |
| 3,341,391 A | 9/1967 | Hamilton et al. | |
| 3,388,032 A | 6/1968 | Saunders | |
| 3,458,388 A | 7/1969 | Moynihan | |
| 3,567,057 A | 3/1971 | Landen | |
| 3,655,432 A | 4/1972 | Hausslein et al. | |
| 3,671,370 A | 6/1972 | Littrell, Jr. | |
| 3,810,815 A | 5/1974 | Welhart et al. | |
| 3,900,655 A | 8/1975 | Wolgemuth | |
| 3,971,687 A * | 7/1976 | Greer et al. | 156/221 |
| 4,045,269 A | 8/1977 | Voss et al. | |
| 4,052,494 A * | 10/1977 | Garrigan et al. | 264/78 |
| 4,121,870 A | 10/1978 | Oakey | |
| 4,143,587 A | 3/1979 | Fujii | |
| 4,157,885 A | 6/1979 | Tippmann | |
| 4,185,069 A | 1/1980 | Smith et al. | |
| 4,278,414 A | 7/1981 | Weisner et al. | |
| 4,352,776 A | 10/1982 | Weisner et al. | |

(Continued)

Primary Examiner — Ryan Ochylski
(74) Attorney, Agent, or Firm — Harness, Dicke & Pierce, P.L.C.

(57) ABSTRACT

A method and an apparatus to form a sheet of polymeric material have first and second mold halves which clamp together on a polymeric sheet. A vacuum mechanism draws the sheet into an interior space. The vacuum mechanism has a plurality of controllable vacuum ports positioned about the interior space to direct the vacuum at specific portions of the sheet. Also, the sensing mechanism determines the draw depth of the sheet.

7 Claims, 4 Drawing Sheets

(56) References Cited

U.S. PATENT DOCUMENTS

| | | |
|---|---|---|
| 4,603,329 A | 7/1986 | Bangerter et al. |
| 4,723,766 A | 2/1988 | Beeding |
| 4,818,465 A * | 4/1989 | Mente .......................... 264/522 |
| 4,877,437 A * | 10/1989 | Nitschke ........................ 65/287 |
| 5,075,166 A | 12/1991 | Sikorski et al. |
| 5,182,065 A | 1/1993 | Piotrowski et al. |
| 5,298,587 A | 3/1994 | Hu et al. |
| 5,320,875 A | 6/1994 | Hu et al. |
| 5,385,465 A | 1/1995 | Greiwe et al. |
| 5,433,786 A | 7/1995 | Hu et al. |
| 5,494,712 A | 2/1996 | Hu et al. |
| 5,529,472 A | 6/1996 | Jenkins |
| 5,590,870 A | 1/1997 | Goellner |
| 5,718,967 A | 2/1998 | Hu et al. |
| 5,843,492 A | 12/1998 | McCorry |
| 5,900,284 A | 5/1999 | Hu |
| 5,979,889 A * | 11/1999 | Klopfenstein .................. 271/11 |
| 6,042,095 A | 3/2000 | Kuchta et al. |
| 6,182,957 B1 | 2/2001 | Becker |
| 6,318,125 B1 * | 11/2001 | Diederen et al. ................ 65/102 |
| 6,367,361 B1 | 4/2002 | Christensen et al. |
| 6,376,064 B1 | 4/2002 | Gasworth et al. |
| 6,397,776 B1 | 6/2002 | Yang et al. |
| 6,432,494 B1 | 8/2002 | Yang et al. |
| 6,733,714 B2 | 5/2004 | Oakey et al. |
| 6,797,384 B2 | 9/2004 | Gasworth et al. |
| 7,425,369 B2 | 9/2008 | Oakey et al. |
| 7,455,510 B2 | 11/2008 | Oakey et al. |
| 2003/0030173 A1 | 2/2003 | Oakey et al. |
| 2003/0071381 A1 | 4/2003 | Oakey et al. |
| 2003/0111160 A1 | 6/2003 | Bolognese et al. |
| 2004/0048023 A1 | 3/2004 | Clieve |
| 2007/0262494 A1 | 11/2007 | Oakey et al. |

* cited by examiner

APPARATUS FOR A MOLD VACUUM SYSTEM AND METHOD OF FORMING A POLYMERIC SHEET UTILIZING THE SYSTEM

CROSS-REFERENCE TO RELATED APPLICATIONS

This application is a divisional of U.S. patent application Ser. No. 11/433,895 filed on May 12, 2006. The entire disclosure of the above application is incorporated herein by reference.

FIELD

The present invention relates generally to forming polymeric material and, more particularly, to a vacuum system in a mold to form the polymeric materials.

BACKGROUND

Polymeric materials are used in a wide variety of applications. Typically, polymeric materials are used to manufacture transparent panels such as windows or windshields for various applications including aircraft, automobiles, motorcycles, boats and the like. Such applications, especially those for aircraft, require an extremely clear, undistorted, transparent panel, which is resistive to scratching and impact.

Traditionally, acrylic plastic is used to form such transparent panels. Acrylic plastic is noted for its excellent optical properties and weatherability, having outstanding resistance to the effects of sunlight and exposure to the elements over long periods of time. Subjected to long term exposure to the elements, acrylic plastic does not experience significant yellowing or any other significant changes in its physical properties. Acrylic plastic, however, does not retain as high an impact strength as do other polymeric materials and thus, are less preferred for applications where impact strength is of importance.

Polycarbonate is a high-performance thermoplastic with the characteristics of high impact strength, optical clarity, heat resistance and dimensional stability. Polycarbonate, on the other hand, does not include the same weatherability characteristics of acrylic plastic. However, the transparent panels, whether produced using acrylic plastic or polycarbonate, include a hard protective coating to prevent scratching, abrasions or other markings that would reduce the service life of the transparent panel. Further, the hard protective coating protects the base sheet, whether acrylic plastic or polycarbonate, from UV degradation. As a result, the transparent panel is protected from any degradation, such as yellowing, distorting, and the like, even though the base sheet (e.g. polycarbonate) would otherwise degrade from such exposure. Therefore, it is desirable in the industry to use polycarbonate for producing transparent panels because of its high impact strength, while it remains protected from UV degradation by the protective coating which is applied regardless of the material used.

Traditionally, polymeric sheets of acrylic plastic are formed using molds that include contoured upper and lower surfaces. The contoured surfaces define the desired shape of the polymeric sheet, directly contacting the entire upper and lower surfaces of the polymeric sheet. Because of the hardness of the upper and lower surfaces of an acrylic plastic sheet, it may be formed in this manner without distorting the upper and lower surfaces. However, the upper and lower surfaces of a polycarbonate sheet are not as hard and therefore, when heated, may be distorted upon contact during the forming process. For this reason, the use of traditional molds, which directly contact the upper and lower surfaces of the polymeric sheet, are not desirable to form polycarbonate sheets. Traditional molds have increased potential for distorting the surfaces of the polycarbonate sheet, thus producing an increased number of rejected panels and driving up production costs.

Applicant's prior application, now U.S. Pat. No. 6,733,714 issued May 11, 2004 and entitled Method for Forming High-Impact Transparent, Distortion-Free Polymeric Material, the specification and drawings of which are expressly incorporated by reference, illustrates an apparatus and method for forming distortion free polymeric materials. While this apparatus and method functions well for its intended purpose, designers strive to improve the art.

SUMMARY

Accordingly, the present invention provides an apparatus to form a sheet of polymeric material. The apparatus includes a first mold half with a bottom wall and a first side wall defining a first interior space. The first sidewall has a first edge. A second mold half has a top wall and a second sidewall which defines the second interior space. The second wall has a second edge. The first and second halves clamp the sheet between the first and second edges. The vacuum mechanism draws the sheet into one of the first and second interior spaces. The vacuum mechanism includes a plurality of controllable vacuum ports. The plurality of controllable vacuum ports is positioned about the mold halves to direct the vacuum at specific portions of the sheet. Also, a mechanism is included to sense a draw depth of a sheet within one of the first or second interior spaces.

The plurality of ports may include a mechanism to vary the vacuum at the plurality of ports to direct the vacuum at a specific portion of the sheet. Each port may include a valve. Ordinarily, the ports are positioned at the periphery of one of the first or second interior spaces. Also, a number of the plurality of ports may be positioned near the center of one of the first or second interior spaces.

In accordance with a second aspect of the teaching, an apparatus to form a sheet of polymeric material comprises a first mold half having a bottom wall and a first sidewall defining a first interior space. The first side wall has a first edge. A second mold half has a top wall and a second sidewall defining a second interior space. The second sidewall has a second edge. The first and second halves clamp the sheet between the first and second edges. A vacuum mechanism draws the sheet into one of the first or second interior spaces. The vacuum mechanism includes one or more manifolds. The one or more manifolds include a plurality of ports. Each port has an independently controlled vacuum source to direct a vacuum at a specific portion of the sheet to draw the specific portion of the sheet into the first or second interior space. A mechanism to sense the draw depth of the sheet is within one of the first or second interior spaces.

Further, the vacuum source may include two manifolds. One of the manifolds is positioned adjacent the periphery of one of the first or second interior spaces. One of the manifolds is positioned adjacent to the center of one of the first or second interior spaces. Each port on the manifolds includes a valve to independently control its vacuum source to direct the vacuum source at a specific portion of the sheet.

Accordingly to an additional aspect of the teaching, a method to form a sheet of polymeric material comprises the steps of heating the sheet to a first temperature. The sheet is retained between the first and second mold halves with the sheet supported along the peripheral edge. A vacuum is generated on one side of the sheet thereby drawing the sheet into an interior space of one of the first or second mold halves. The vacuum is controlled at specific locations along the sheet in the interior space of one of the first or second halves so that a different vacuum pressure is created at the different locations to enhance drawing of the sheet into the interior space at the specific location. The sheet is cooled from the first temperature to a second temperature upon achieving a specific draw depth of the sheet within one of the first or second mold halves. A first vacuum is drawn adjacent at least a portion of the peripheral edge of one of the mold halves. A second vacuum is drawn adjacent a center of one of the interior spaces. The first vacuum is greater than the second vacuum. Further, a plurality of independent vacuums may be generated at specific locations along the sheet. The vacuums are controlled at the specific locations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
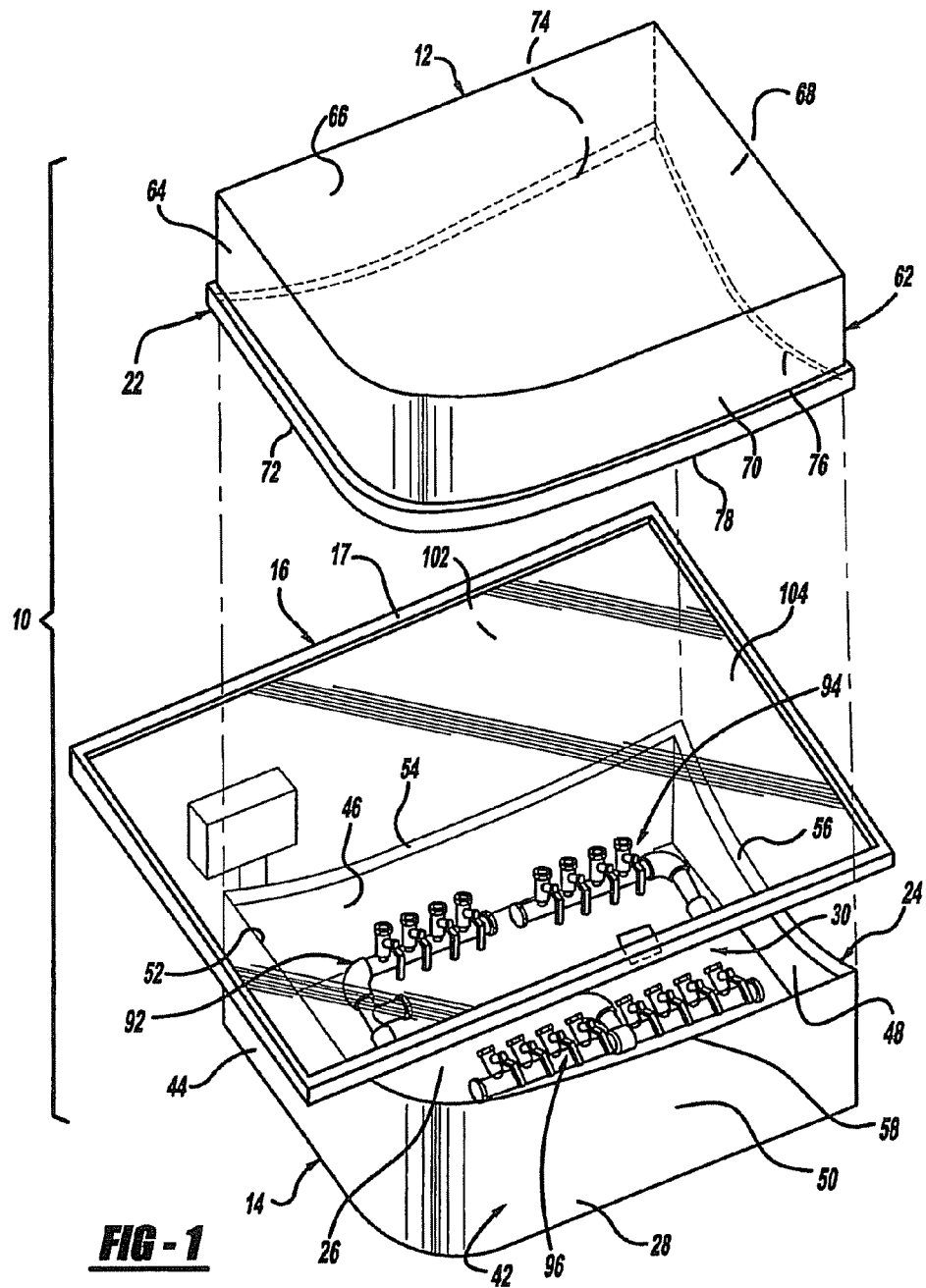
FIG. 1 is a perspective view of a forming mold.

Turning to the figures, particularly FIG. 1, a forming mold 10 is illustrated with an upper and lower half 12, 14 which come together to form a heated sheet of polymeric material 16. The sheet 16 is preferably an optical quality polycarbonate material and may be retained within a rigid frame 18. The frame has a length and width somewhat greater than that of upper and lower halves. The frame clamps the sheet 16 about its periphery. Edges 22, 24 of the upper and lower halves 12 and 14 are contoured to define a desired end form for the peripheral edge of the sheet 16. A vacuum is created by a vacuum system 30 within an interior space 26 of a lower mold half 14 to draw the sheet 1 downward to form the sheet as defined by the contoured edges 22 and 24 of upper and lower halves 12 and 14. The drawing process ensues until the sheet is registered by a sensor eye 32 which, in turn, ceases the vacuum. A cooling mechanism 25 is disposed within an interior space 34 of the upper half 12. The cooling mechanism 25 cools the sheet into its desired form.

Figure 2:
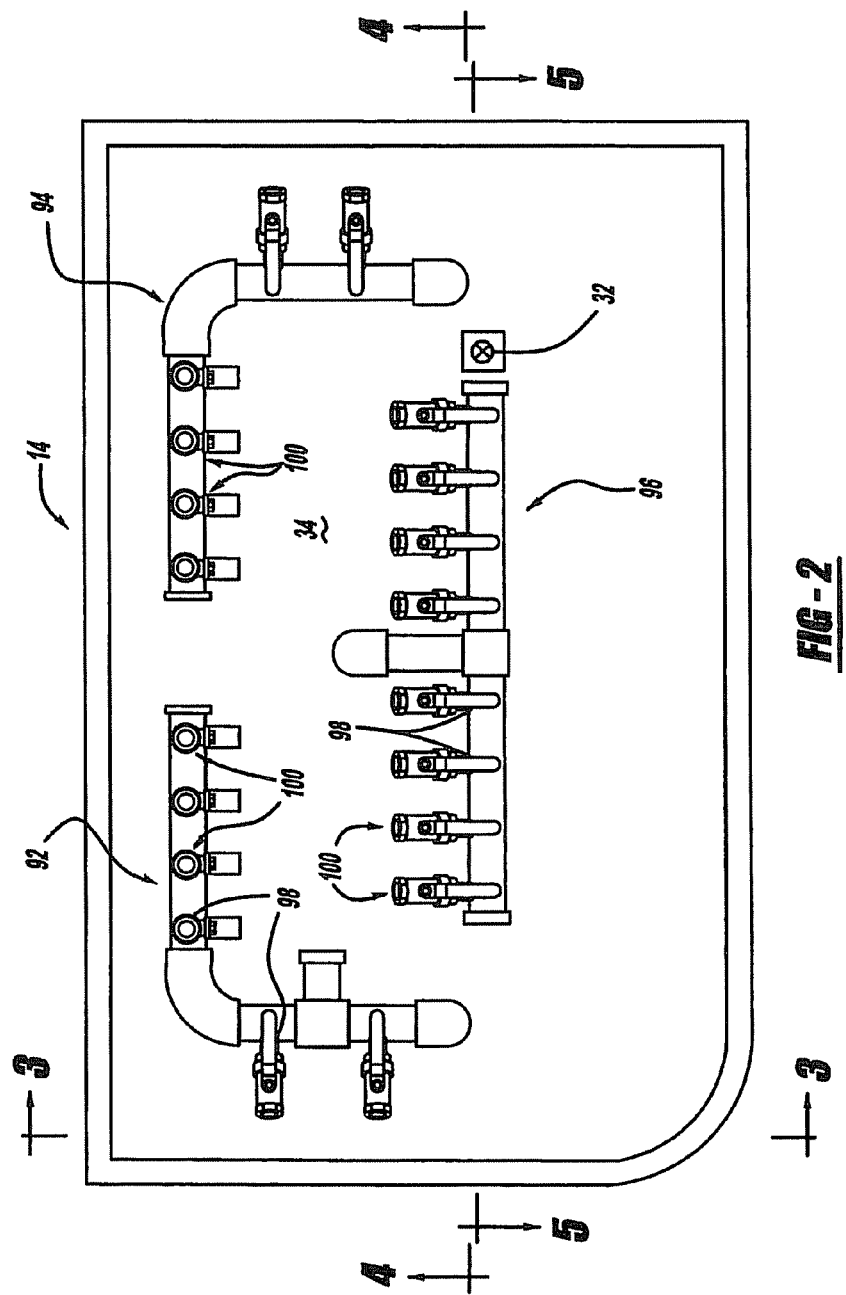
FIG. 2 is a top plan view of a mold half with a vacuum system.
Figure 3:
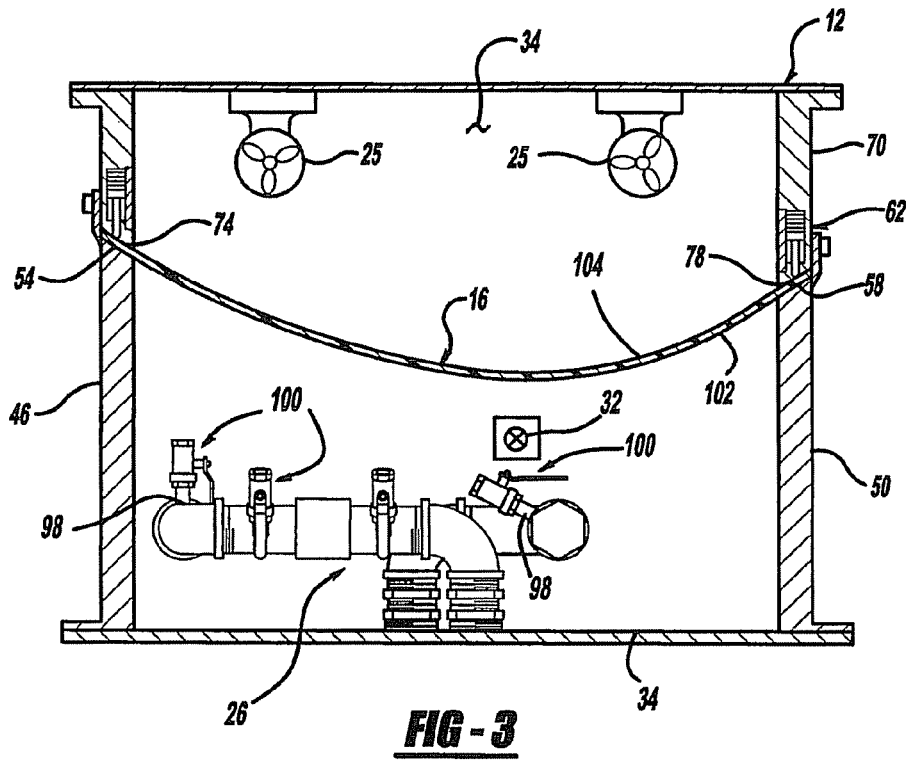
FIG. 3 is a cross-section view through the mold halves along line 3-3 of FIG. 2.
Figure 5:
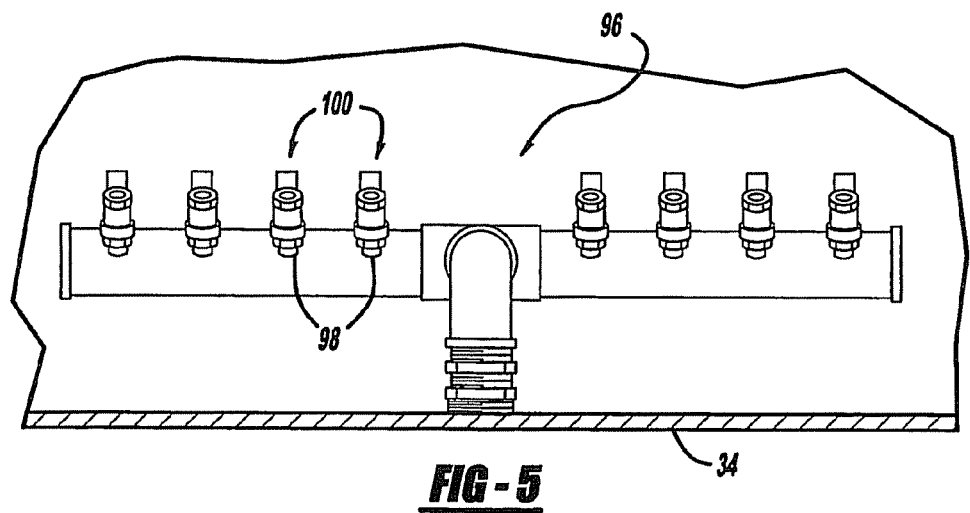
FIG. 5 is a cross-section view along line 5-5 of FIG. 2.
Figure 4:
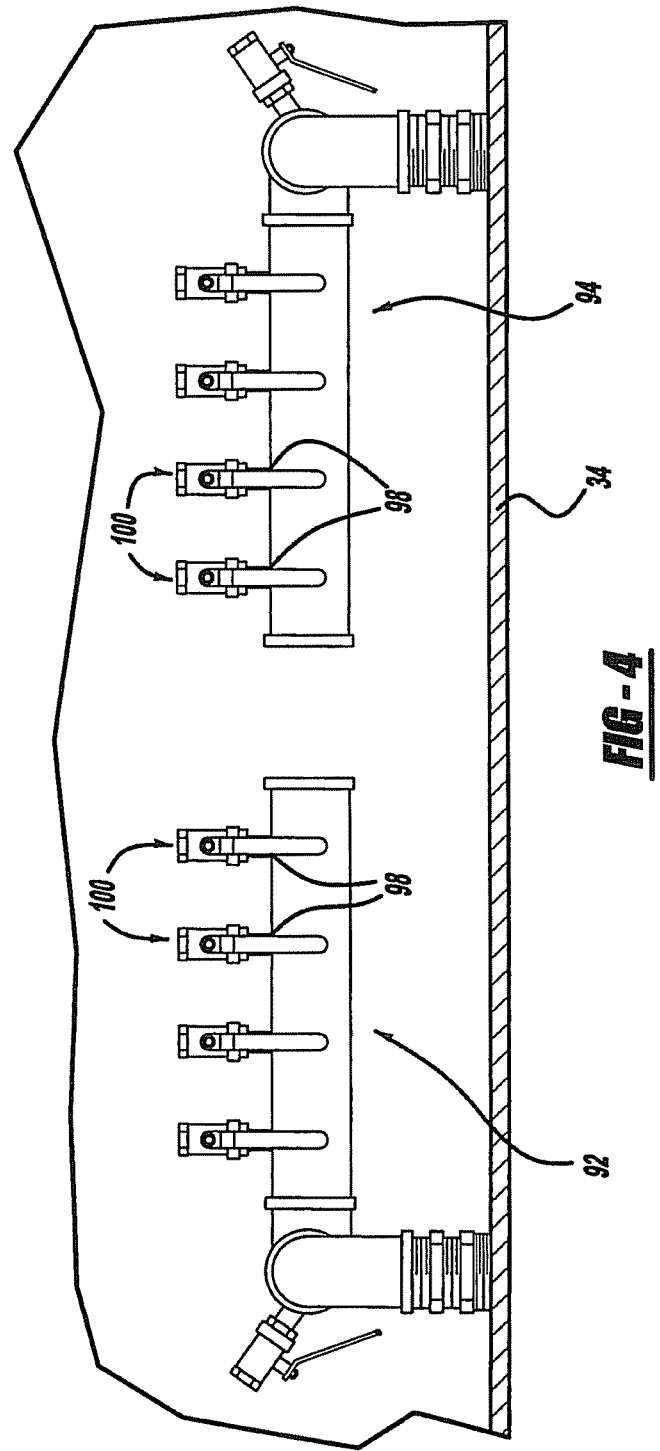
FIG. 4 is a cross-section view along line 4-4 of FIG. 2.

In an exemplary embodiment, the forming mold 10 is configured to form an aircraft windshield. As seen in FIGS. 1 and 2, the perimeter of the mold corresponds to the shape for particular application. It will be appreciated, however, that the mold 10 can be configured to form sheets 16 into various shapes and contours in accordance with the requirements of a variety of applications. The lower half 14 includes a bottom wall 42 and four sidewalls 44, 46, 48, and 50 defining the interior space 26. The sidewalls 44, 46, 48, and 50 have upper edges 52, 54, 56, and 58, respectively, and are selectively contoured along their lengths for defining the end form of the peripheral edge of the sheet 16. The upper edges 52, 54, 56, and 58 are preferably beveled, sloping downward towards the interior of the lower half 14. The upper half 12 includes a top wall 62 and four sidewalls 64, 66, 68, and 70 defining the interior space 34. The sidewalls 64, 66, 68, and 70 have lower edges 72, 74, 76 and 78, respectively, and are correspondingly contoured along their lengths to engage the upper edges 52, 54, 56, and 58. The lower edges 72, 74, 76 and 78 are preferably beveled slipping downwards toward the interior of the lower half 14 for corresponding alignment with the beveled upper edges 52, 54, 56, and 58.

The sheet 16 is retained in the molds by mechanism like those disclosed in Applicant's U.S. Pat. No. 6,733,714 issued May 11, 2004 and entitled Method for Forming High-Impact Transparent, Distortion-Free Polymeric Material, the specification and drawings of which are expressly incorporated by reference. Also, a mechanism for trimming the polycarbonate sheet is like those disclosed in the patent.

The vacuum system 30 is coupled with a vacuum source through the bottom wall 34 of the lower half 14. The vacuum system 30 includes one or more manifolds. Here, the lower mold half includes three manifolds 92, 94, and 96. Each manifold is connected with a vacuum source which extends through the bottom of the mold half. The manifolds 92, 94, and 96 include a plurality of ports 98. The ports 98 include adjustable valves 100. The valves 100, as shown, are manually operated. The valves 100 are at a desired angle with respect to the manifolds. This enables "aiming" to the vacuum source at the sheet 16. Alternatively, the valves could be solenoid valves and be operated by a computer. The valves 100 enable independent control of the vacuum source at each valve at a specific location or position along the sheet 16. Thus, by adjusting the vacuum of each valve, it in turn enables the sheet to be drawn into the mold at different positions along the sheet 16. This enables control of the direction of the vacuum to areas where the sheet must be drawn to deeper depths or where the surface shape of the sheet needs to be altered.

Preferably, the manifolds 92 and 94 are positioned about the periphery of the lower mold half 14. The manifold 96 is positioned near the center of the mold half 14. The angle and direction of the valves 100 can be altered to fit a specific design of the to be molded sheet. It has been found that to draw the sheet into the mold in a preferred position, that the valves along the periphery are substantially wide open enabling full vacuum directed at the sheet. The valves on the center manifold 96 may be opened to less than halfway to draw the sheet into the desired shape of the specific position. Ordinarily, the valves in the center manifold may be opened about 40%. Thus, each port enables independent control of the vacuum source at that position along the sheet. Thus, the depth of draw can be controlled at a specific position along the sheet 16.

The sensor eye 32 may be positioned adjacent the manifolds 92, 94 and 96. Ordinarily, the sensor is of the ultrasonic type which includes an eye to control the draw of depth. Also, a sensing system like that disclosed in Applicant's U.S. Pat. No. 6,733,714 issued May 11, 2004 and entitled Method for Forming High-Impact Transparent, Distortion-Free Polymeric Material, the drawings and specification of which are herein incorporated by reference, could be used.

A cooling mechanism may be disposed in the interior surface of the upper half 14 fixedly attached to the top wall. The cooling mechanism may be like those disclosed in Applicant's previous U.S. patent.

A controller is provided and is in electrical communication with various components of the forming mold 10, including the sensing mechanism 32 and the cooling mechanism. Depending upon the particular embodiment, the controller 200 may also be in electrical communication with laser or water jet trimming mechanisms for controlling their activity. The controller 200 controls the forming process as discussed in detail below.

The present invention provides a method of forming the sheet 16 of polymeric material, preferably utilizing the above-detailed forming mold 10. The method of the present invention will be described in detail. Initially, the sheet 16 is loaded into the frame 18. The sheet 16 is heated in stages until it is heated past a glass transition temperature, achieving a glass-transition stage, thereby becoming viscous or rubbery. It should be noted, however, that the sheet should not be heated to the point that it reaches a melting temperature, whereby the sheet would melt and become scrap. The number of heating stages, their respective lengths and temperatures, may vary in accordance with the type of material and the thickness of material used. Heating the sheet 16 in stages avoids possible blistering or other deformation of the surface of the sheet 16 that could otherwise occur.

The sheet 16 is subsequently brought into the forming stage and placed on top of the lower half 14, with a bottom surface 102 resting on the upper edges 52, 54, 56, 58 of the sidewalls 44, 46, 48, 50. The upper half 12 travels downward in alignment with the lower half 14, whereby the lower edges 72, 74, 76, 78 of the side walls 64, 66, 68, 70 engage an upper surface 104 of the sheet 16 thereby retaining the sheet 16 therebetween. The frame holds the perimeter of the sheet 16 in rigid form, whereby the sheet 16 is pulled and stretched as it is enclosed within the forming mold 10. Concurrently, a retention mechanism provides a downward force, biasing the bottom surface 102 of the sheet 16 into tight engagement with the upper edges 52, 54, 56, 58 of the sidewalls 44, 46, 48, 50 creating an airtight seal therebetween. Additionally, the edges of the sheet 16 are trimmed in accordance with the perimeter shape of the forming mold 10. In accordance with the preferred embodiment, trimming of the sheet 16 occurs concurrently with the closing of the upper and lower halves 12, 14. In an alternative embodiment, however, trimming may occur subsequent to the upper and lower halves 12, 14 closing. Alternatively, the trimming operation may be performed once sheet 16 has been formed.

Once the sheet 16 is retained between the upper and lower halves 12, 14, a vacuum is created within the interior space 26 of the lower half 12 by drawing air from the interior space 26, through manifold ports 98 via valve 100. The vacuum is achievable due to the airtight seal between the bottom surface 102 of the sheet 16 and the upper edges 52, 54, 56 58 of the sidewalls 44, 46, 48, 50. The vacuum ports 98 can be directed at the sheet to ensure proper drawing of the sheet. Also, each port vacuum source can be controlled via its valve 100. As a result, the sheet 16 is drawn downward by the controlled directed vacuum force into the interior space 26, thus forming the desired shape. The sensing mechanism 32 senses when the sheet achieves a particular draw depth within the interior space 26. Upon sensing the sheet 16 achieving the draw depth, the cooling mechanisms are activated for cooling the sheet 16 below its glass-transition temperature, thereby again achieving a rigid state. The vacuum is held at steady state during the cooling process and is not relieved until the sheet 16 is sufficiently cooled. The cooling time of the sheet may be monitored by the controller 200, which controls each of the above-described activities. Once the sheet 16 is sufficiently cooled, the vacuum is relieved from the lower half 14 and the upper half 12 withdraws. The frame 18, with excess sheet material, is also withdrawn, thereby leaving the formed sheet 16 accessible for removal from the forming mold 10. A secondary clamping mechanism is used to grasp a perimeter edge of the sheet 16 and carry it through the remaining processes.

Subsequent to the forming process, the frame and excess material are carried away for reprocessing of the excess material and the formed sheet 16 undergoes several finishing processes for producing an end product. These stages preferably include a first quality check, primer and coating stages at steps, respectively, and a second quality check. The first and second quality checks are preferably achieved using optical means, such as a camera, for checking the polymeric sheet 16 for any distortion, scratches and/or abrasions. The primer and coating stages preferably include priming via dip or spray, a primer drying sub-step, a hard coat application sub-step and a hard coat drying sub-step. It will be appreciated, however, that the herein described finishing processes are merely exemplary in nature and may be substituted for or further include any one of a number of other finishing processes commonly known in the art. Finally, the finished sheet 16 is packaged for customer delivery.

It should be noted that at least the primer and coating stages will be performed under strict temperature humidity and dust controlled conditions to ensure proper flow free coating of sheet 16. The primer coat may be of any suitable material capable of providing a clear distortion free bond with sheet 16 and the top coat. At present, the preferred primer and top coating materials are experimental materials supplied by General Electric Co. applied by a flow coating process that are believed to offer an improved life span of 8-10 years which is significantly longer than currently available materials which may be utilized for this purpose. Preferably, the primer and hard coat will be applied to both surfaces of sheet 16.

Although the supporting description herein describes a generally linear processing line for forming polymeric material, it will be appreciated by those skilled in the art that the processing line may vary in layout. For example, it is anticipated that the processing line may be a rotary line, whereby the processing steps are generally organized as a circle. In this manner, the sheet 16 rotates about the circular layout through each of the processing stages for forming the finished product.

While it will be apparent that the preferred embodiments of the invention disclosed are well calculated to provide the above-stated advantages, it will be appreciated that the invention is susceptible to modification, variation and change without departing from the proper scope or fair meaning of the subjoined claims.

What is claimed is:

1. A method for forming a sheet of polymeric material, comprising the steps of:

heating the sheet to a first temperature;

retaining the sheet between first and second mold halves of a forming mold with the sheet supported only along a peripheral edge;

generating a first vacuum on one side of the sheet thereby drawing the sheet into an interior space of one of said first and second mold halves, wherein the sheet is devoid of contact with an interior surface of the first and second mold halves;

controlling said first vacuum to create a second independent vacuum off of the first vacuum with a pressure different than a vacuum pressure from the first vacuum, directing the second independent vacuum at a first specific location in said interior space of one of said first and second mold halves for enhancing drawing of a portion of the sheet, associated with the second independent vacuum, at the first specific location into the interior space at the first specific location such that the sheet at the first specific location does not contact the interior surface of the first or second mold half and other portions of the sheet are not affected by the second independent vacuum so that the second independent vacuum may work exclusively on the first specific location while another independent vacuum works exclusively on another mutually exclusive second specific location; and cooling the sheet from said first temperature to a second temperature upon achieving a specified draw depth of the sheet within one of said first and second mold halves.

2. The method of claim 1, further comprising drawing the first vacuum adjacent at least a portion of the peripheral edge of said mold halves.

3. The method of claim 2, further comprising drawing the second vacuum adjacent a center of the interior space.

4. The method of claim 3, wherein said first vacuum is greater than said second vacuum.

5. The method of claim 1, further comprising generating a plurality of independent vacuums at said specific locations.

6. The method of claim 5, further comprising controlling the vacuum pressure at said specific locations.

7. The method of claim 1, further comprising positioning one or more manifolds in said interior space and drawing the first vacuum through said one or more manifolds.

* * * * *